(12) United States Patent
Wang et al.

(10) Patent No.: US 7,965,803 B2
(45) Date of Patent: Jun. 21, 2011

(54) METHODS AND SYSTEMS FOR PROVIDING FEEDBACK FOR BEAMFORMING

(75) Inventors: Xiaodong Wang, Ramsey, NJ (US);
Filippo Zuccardi Merli, Correggio (IT)

(73) Assignee: The Trustees of Columbia University in the City of New York, New York, NY (US)

( * ) Notice: Subject to any disclaimer, the term of this patent is extended or adjusted under 35 U.S.C. 154(b) by 500 days.

(21) Appl. No.: 11/957,385

(22) Filed: Dec. 14, 2007

(65) Prior Publication Data

US 2008/0285665 A1  Nov. 20, 2008

Related U.S. Application Data

(60) Provisional application No. 60/875,416, filed on Dec. 14, 2006.

(51) Int. Cl.
*H04L 7/00* (2006.01)
(52) U.S. Cl. ........................................... 375/358
(58) Field of Classification Search .................. 375/260, 375/267, 285, 295, 299, 316, 340, 358; 455/68–69, 455/562.1
See application file for complete search history.

(56) References Cited

U.S. PATENT DOCUMENTS

| | | | |
|---|---|---|---|
| 6,282,168 B1 | 8/2001 | Vijayan et al. | |
| 6,629,287 B1 | 9/2003 | Brink | |
| 6,745,009 B2 * | 6/2004 | Raghothaman | 455/63.1 |
| 6,873,606 B2 | 3/2005 | Agrawal et al. | |
| 6,952,455 B1 * | 10/2005 | Banister | 375/267 |
| 7,006,804 B1 | 2/2006 | Clark et al. | |
| 7,027,533 B2 | 4/2006 | Abe et al. | |
| 7,076,263 B2 | 7/2006 | Medvedev et al. | |
| 7,180,956 B1 * | 2/2007 | Banister | 375/267 |
| 7,184,773 B2 | 2/2007 | Nagai et al. | |
| 7,212,838 B2 * | 5/2007 | Raghothaman | 455/562.1 |
| 7,221,956 B2 | 5/2007 | Medvedev et al. | |
| 7,224,758 B1 * | 5/2007 | Banister | 375/358 |
| 7,236,538 B1 * | 6/2007 | Banister | 375/267 |
| 7,236,546 B2 | 6/2007 | Egnor et al. | |
| 7,248,638 B1 * | 7/2007 | Banister | 375/267 |
| 7,593,489 B2 | 9/2009 | Koshy et al. | |
| 7,616,699 B2 | 11/2009 | Niu et al. | |
| 7,751,506 B2 | 7/2010 | Niu et al. | |
| 2003/0215006 A1 | 11/2003 | Ragothaman | |
| 2005/0047517 A1 | 3/2005 | Georgios et al. | |
| 2005/0130694 A1 | 6/2005 | Medvedev et al. | |
| 2005/0255808 A1 | 11/2005 | Ahmed et al. | |
| 2007/0076582 A1 | 4/2007 | Tanaka et al. | |
| 2007/0098094 A1 | 5/2007 | Yue et al. | |

(Continued)

OTHER PUBLICATIONS

"Channel Estimation for Multicarrier Systems". Available at http://www.elet.polimi.it/dsp/tlc/ofdm.htm Nov. 30, 2007.

(Continued)

*Primary Examiner* — Khanh C Tran
(74) *Attorney, Agent, or Firm* — Byrne Poh LLP

(57) ABSTRACT

In some embodiments, methods and systems for providing feedback for beamforming include: initializing a weighting vector; determining a perturbation vector; determining a plurality of weighting vectors to be applied to data based on the weighting vector and the perturbation vector; applying the plurality of weighting vectors to the data to provide weighted data; transmitting the weighted data to a receiver; receiving from the receiver a feedback signal based on at least one of the plurality of weighting vectors; and updating the plurality of weighting vectors based on the feedback signal.

24 Claims, 6 Drawing Sheets

U.S. PATENT DOCUMENTS

2007/0191067 A1* 8/2007 Nguyen et al. ............ 455/562.1

OTHER PUBLICATIONS

Owen, "Latin Supercube Sampling for Very High Dimensional Simulations," ACM Trans. Model. Comput. Simulation, vol. 8, No. 2, pp. 71-102, 1998.
3GPP, R1-062650, Texas Instruments, "Codebook Design for E-ULTRA MIMO Precoding."
Ahmed, N., Khojastepour, M. A., Sabharwal, A., and Aazhang, B., "Outage Minimization Feedback for the Fading Relay Channel," IEEE Trans. Commun., vol. 54, No. 4, pp. 659-669, Apr. 2006.
Alamouti, S. M., "A Simple Transmit Diversity Technique for Wireless Communications," IEEE J. Select. Areas Commun., 16(8): 1451-1458, Oct. 1998.
Alspach, D. L. and Sorenson, H. W., "Nonlinear Bayesian Estimation Using the Gaussian Sum Approximation," IEEE Trans. Autom. Control, vol. 17, pp. 439-448, 1972.
Altera. "Implementing OFDM Using Altera Intellectual Property." White Paper, Mar. 2001.
Arulampalam, S., Maskell, S., Gordan, N., and Clapp, T., "A Tutorial on Particle Filter for On-Line Nonlinear/Non-Gaussian Bayesian Tracking," IEEE Trans. Signal Process., vol. 50, No. 2, pp. 174-188, Feb. 2002.
Banister, B. C. and Zeidler, J. R., "A Simple Gradient Sign Algorithm for Transmit Antenna Weight Adaption With Feedback", IEEE Trans. On Sign. Proc., vol. 51, No. 5, pp. 1156-1171, May 2003.
Banister, B. C. and Zeidler, J. R., "Feedback Assisted Stochastic Gradient Adaption of Multiantenna Transmission", IEEE Trans. On Wireless Commun., vol. 4, No. 3, pp. 1121-1135, May 2005.
Banister, B. C. and Zeidler, J. R., "Feedback Assisted Transmission Subspace Tracking for MIMO Systems", IEEE J. on Select. Areas in Commun., vol. 21, No. 3, pp. 452-463, Apr. 2003.
Berrou, Claude, Glavieux, A., and Thitimajshima, P. "Near Shannon Limit Error—Correcting Coding and Decoding: Turbo-Codes (1)," Ecole Nationale Superieure des Telecommunications de Bretagne, France, 1991.
Caire, G., Guemghar, S., Roumy, A., and Verdu, S. "Maximizing the Spectral Efficiency of Coded CDMA Under Successive Decoding." IEEE Trans. Inform. Theory, vol. 50, No. 1, pp. 152-164, Jan. 2004.
Crisan, D. and Doucet, A., "A Survey of Covergence Results on Particle Filtering for Practitioners," IEEE Trans. Signal Process., vol. 50, No. 3, pp. 736-746, Mar. 2002.
Cui, T. and Tellambura, C., "Robust Joint Frequency Offset and Channel Estimation for OFDM Systems," IEEE Veh. Tech. Conf. 2004, vol. 1, pp. 603-607, Sep. 26-29, 2004.
Doucet, A. and Wang, X., "Monte Carlo Methods for Signal Processing," IEEE Sign. Proc. Mag., vol. 22, No. 6, pp. 152-170, Nov. 2005.
Doucet, A., Godsill, S. J., and Andrieu, C., "On Sequential Simulation-Based Methods for Bayesian Filtering," Stat. Comput., vol. 10, No. 3, pp. 197-208, 2000.
Farrokhi, F. R., Tassiulas, L., and Liu, K. J. R., "Joint Optimal Power Control and Beamforming in Wireless Networks Using Antenna Arrays," IEEE Trans. Commun., vol. 46, No. 10, pp. 1313-1324, Oct. 1998.
Fearnhead, P., "Using Random Quasi-Monte-Carlo Within Particle Filters, With Application to Financial Time Series," J. Computat. Graph. Stat., vol. 14, pp. 751-769, 2005.
Fortman, T. E., Bar-Shalom, Y., and Scheffe, M., "Sonar Tracking of Mutliple Targets Using Joint Probabilistic Data Association." IEEE J. Ocean. Eng., vol. OE-8, No. 7, pp. 173-184, Jul. 1983.
Foschini, G. J., "Layered Space-Time Architecture for Wireless Communication in a Fading Environment When Using Multi-Element Antennas." Bell Labs Tech. J., 1(2): 41-59, Oct. 1996.
Gerstner, T., and Griebel, M., "Numerical Integration Using Sparse Grids," Numerical Algorithms, vol. 18, No. 4, pp. 209-232, 1998.
Gesbert, D., Shafi, M., Shiu, D. S., Smith, P. J., and Naguib, A., "From Theory to Practice: An Overview of MIMO Space-Time Coded Wireless Systems," IEEE J Select Areas Commun., vol. 21, No. 3, pp. 281-302, Apr. 2003.
Geweke, J., "Bayesian Inference in Econometric Models Using Monte Carlo Integration," Econometrica, vol. 57, No. 6, pp. 1317-1339, 1989.
Gordon, N. J., Salmon, D. J., and Smith, A. F. M., "A Novel Approach to Nonlinear/Non-Gaussian Bayesian State Estimation," Inst. Elect. Eng. Proc. Radar Signal Process., vol. 140, pp. 107-113, 1993.
Guo, D., and Wang, X., "Quasi-Monte Carlo Filtering in Nonlinear Dyanmic Systems," IEEE Trans. Sign. Proc., vol. 54, No. 6, pp. 2087-2098, Jun. 2006.
Guo, D., Wang, X., and Chen, R., "New Sequential Monte Carlo Methods for Nonlinear Dyanmic Systems," Stat. Comput., vol. 15, No. 2, pp. 135-147, 2005.
Handschin, J. E., "Monte Carlo Techniques for Prediction and Filtering of Nonlinear Stochastic Processes," Automatica, vol. 1970, No. 6, pp. 555-563, May 2003.
Henderson, S., Chiera, R., and Cooke, R., "Generating 'Dependent' Quasirandom Numbers," In Proc. 2000 Windter Simulation Conf., J. Joins, R. Barton, and P. Fishwick, Eds., 2000, pp. 527-536.
Hue, C., Cadre, J., and Perez, P., "Sequential Monte Carlo Methods for Multiple Target Tracking and Data Fusion," IEEE Trans. Signal Process., vol. 50, No. 2, pp. 309-325, Feb. 2002.
International Search Report and Written Opinion of the International Searching Authority. International Patent Application No. PCT/US2008/067546.
Ito, K. and Xiang, K., "Gaussian Filters for Nonlinear Filtering Problems," IEEE Trans. Autom. Control, vol. 45, No. 5, pp. 827-910, May 2000.
Julier, J. and Durront-Whyte, H. F., "A New Method for the Nonlinear Transformation of Means and Covariances in Filters and Estimators," IEEE Trans Autom. Control, vol. 45, No. 3, pp. 477-482, Mar. 2000.
Keller, T. and Hanzo, L., "Adaptive Multicarrier Modulation: A Convenient Framework for Time-Frequency Processing in Wireless Communications," IEEE Proc., vol. 68, No. 5, pp. 611-640, Apr. 2000.
Kotecha, J. and Djuric, P., "Gaussian Sum Particle Filtering," IEEE Trans. Signal Process., vol. 51, No. 10, pp. 2602-2612, Oct. 2003.
L'Ecuyer, P. and Lemieux, C., "recent Advanced in Randomized Quasi-Monte Carlo Methods". Boston, MA: Kluwer Academic, 2002. Modeling Uncertainty: An Examination of Stochastic Theory, Methods, and Applications.
Leung, W. K., Wu, K. Y., and Ping, Li. "Interleave-Division-Multiplexing Space-Time Codes." In Proc. 2003 IEEE Veh. Tech. Conf. (VTC'03 Spring), pp. 1094-1098, Jeju, Korea, Apr. 2003.
Li, C., Li, K., Wang, X., and Ping, L. And Interleave-Division-Multiplexing MISO System with Partial CSI at Transmitter. IEEE Trans. Veh. Tech., to appear.
Li, K and Wang, X. "Exit Chart Analysis of Turbo Multiuser Detection," 41st Ann. Allerton Conf. Commun., Control, & Computing, Allerton, IL, USA, Oct. 2003.
Li, K., Ping, L., and Wang, X. "Analysis and Optimization of Interleave-Division Multiple-Access Communication Systems." In Proc. of IEEE Int'l Conf. on Acoust. Speech & Sig. Proc., Philadelphia, PA, Mar. 2005.
Li, S., Huang, D., Letaief, K. B., and Zhou, Z., "Multi-Stage Beamforming for Coded OFDM with Multiple Transmit and Multiple Receiver Antennas," IEEE Trans. Wireless Commun., vol. 6, No. 3, pp. 959-969, Mar. 2007.
Li, Y., Seshadri, N., and Ariyavisitakul, S., "Channel Estimation for OFDM Systems with Transmitter Diversity in Mobile Wireless Channels," IEEE J. Select. Areas Commun., vol. 17, No. 3, pp. 461-471, Mar. 1999.
Liu, J. S. and Chen, R., "Sequential Monte Carlo Methods for Dynamic Systems," J. Amer. Statist. Assoc., vol. 93, pp. 1032-1044, 1998.
Liu, L. and Jafarkhani, H., "Successive Transmit Beamforming Algorithms for Mutliple-Antenna OFDM Systems," IEEE Trans. Wireless Commun., vol. 6, No. 4, pp. 1512-1522, Apr. 2007.
Liu, Z., Xin, Y., and Giannakis, G. B., "Linear Constellation Precoding for OFDM with Maximum Multipat Diversity and Coding Gains," IEEE Trans. Commun., vol. 51, No. 3, pp. 416-427, Mar. 2003.

Marsaglia, G. and Zaman, A., "Rapid Evaluation of the Inverse of the Normal Distribution Function," Statist. Prob. Lett., vol. 19, pp. 259-266, 1994.

Mondal, B. and Heath, R. W., "Channel Adaptive Quantization for Limited feedback MIMO Beamforming Systems," IEEE Trans. Sign. Proc., vol. 54, No. 12, pp. 4717-4729, Dec. 2006.

Office Action dated Aug. 30, 2010 in U.S. Appl. No. 11/957,385.

Ormoneit, D., Lemieux, C. and Fleet, D., "Lattice Particle Filters," Proc. 17th Annu. Conf. Uncertainty in Artificial Intelligence, pp. 395-402, 2001.

Owen, A., "Monte Carlo Variance of Scrambled Net Quadrature," SIAM J. Numer. Anal., vol. 34, No. 5, pp. 1884-1910, 1997.

Pande, T., Love, D. J., and Krogmeier, J. V., "A Weighted Least Squares Approach to Precoding with Pilots for MIMO-OFDM," School of Electrical and Computer Engineering, Purdue University, Dec. 14, 2005.

Papadias, C. B. and Foschini, G. J. "Capacity-Approaching Space-Time Codes for Systems Employing Four Transmitter Antennas," IEEE Trans. Inform. Theory, 49(3): 726-733, Mar. 2003.

Papageorgiou, A., "Fast Convergence of Quasi-Monte Carlo for a Class of Isotropic Integrals," Math. Computat., vol. 70, No. 4, pp. 297-306, 2001.

Petras, K., "Fast Calculation of Coefficients in the Smolyak Algorithm," Numerical Algorithms, vol. 26, No. 2, pp. 93-109, 2001.

Philomin, V., Duraiswami, R., and Davis, L. S., "Quasirandom Sampling for Condensation," in Proc. Eur. Conf. Computer Vision, 2000, pp. 134-149.

Ping, L., Leung, W. K., and Wu, K. Y. "Low-Rate Turbo-Hadamard Codes," IEEE Trans. Inform. Theory, vol. 49, No. 12, pp. 3213-3224, Dec. 2003.

Ping, L., Liu, L., Wu, K., and Lehung, W. K. "Interleave Division Multiple Access (IDMA) Communication Systems," 3rd Int'l Symp. Turbo Codes & Related Topics, pp. 173-180, Brest, france, Sep. 2003.

Price, K. and Storn, R. "Differential Evolution—A Simple and Efficient Heuristic for Global Optimization Over Continuous Spaces," J. Global Optimization, 11:341-359, 1997.

Pukkila, M., "Channel Estimation Modeling," Nokia Research Center, HUT Dec. 19, 2000.

Richardson, T., Shokrollahi, A., and Urbanke, R. "Design of Capacity-Approaching Irregular Low-Density Parity-Check Codes," IEEE Trans. Inform. Theory, vol. 47, No. 2, pp. 619-637, Feb. 2001.

Roh, J. C. and Rao, B. D., "Transmit Beamforming in Mutliple-Antenna Systems with Finite Rate Feedback: A VQ-Based Approach," IEEE Trans. Inf. Theory, vol. 52, No. 3, pp. 1101-1112, Mar. 2006.

Sellathurai, M. and Haykin, S. "Turbo-BLAST for Wireless Communications: Theory and Experiments." IEEE Trans. Sig. proc., 50(10):2538-2546, Oct. 2002.

Sellathurai, M. and Haykin, S. "Turbo-BLAST: Performance Evaluation in Correlated Rayleigh-Fading Environment." IEEE J. Select. Areas Commun., 21(3):340-349, Apr. 2003.

Shahbazpanahi, S. Gershman, A. B., Luo, Z.-Q., and Wong, K. M., "Robust Adaptive Beamforming for General-Rank Signal Models," IEEE Trans. Sign. Proc., vol. 51, No. 9, pp. 2257-2269, Sep. 2003.

Shamai, S. and Verdu, S. "The Impact of Frequency-Flat Fading on the Spectral Efficiency of CDMA," IEEE Trans. Inform. Theory, vol. 47, No. 4, pp. 1302-1327, May 2001.

Tarokh, V., Jafarkhani, H., and Calderbank, A. R. "Space-Time Block Codes from Orthogonal Designs." IEEE Trans. Inform. Theory, 45(4):1456-1467, Jul. 1999.

Tarokh, V., Jafarkhani, H., and Calderbank, A. R. "Space-Time Block Coding for Wireless Communications: Performance Results." IEEE J. Select. Areas Commun., 17(3):451-460, Mar. 1999.

Tse, D. and Hanly, S. "Linear Multiuser Receivers: Effective Interference, Effective Bandwidth and User Capacity," IEEE Trans. Inform. Theory, vol. 45, No. 2, pp. 614-657, Mar. 1999.

Tse, D. N. C., Viswanath, P., and Zheng, L., "Diversity-Multiplexing Tradeoff in Multiple-Access Channels," IEEE Trans. Inform. Theory, vol. 50, No. 9, pp. 1859-1874, Sep. 2004.

U.S. Appl. No. 11/957,409, filed Dec. 14, 2007.

U.S. Appl. No. 12/665,684, filed Dec. 18, 2009.

U.S. Appl. No. 60/875,416, filed Dec. 14, 2006.

U.S. Appl. No. 60/875,417, filed Dec. 14, 2006.

Wang, X. and Hickernell, F., "Randomized Halton Sequences," Math. Comput. Model., vol. 32, No. 4, pp. 867-899, 2000.

Wang, X. and Poor, H. V. "Iterative (Turbo) Soft Interference Cancellation and Decoding for Coded CDMA." IEEE Trans. Commun., 46(7):1046-1061, Jul. 1999.

West, M., "Mixture Models, Monte Carlo, Bayesian Updating and Dynamic Models," Comput. Sci. Stat., vol. 24, pp. 325-333, 1993.

Wu. K. Y., Leung, W. K., and Ping, Li. "A Simple Approach to Near-Optimal Multiple Transmit Antenna Space-Time Codes." In Proc. 2003 IEEE Int. Conf. Commun. (ICC'03), pp. 2603-2607, Anchorage, AK, May 2003.

Wu, K. Y., Ping, L., and Leung, W. K. "Multi-layer Turbo Space-Time Codes for High-Rate Applications." In Proc. 2004 IEEE Global Telecommun. Conf. (GLOBECOM'04), pp. 3758-3762, Dallas, TX. Dec. 2004.

Yang, H., "A Road to Future Broadband Wireless Access: MIMO-OFDM-Based Air Interface," IEEE Commun. Mag., vol. 43, No. 1, pp. 53-60, Jan. 2005.

Zuccardi Merli, F. and Vitetta, G. M., "Blind Feedforward Frequency Estimation for OFDM Signals Transmitted Over Multipath Fading Channels," IEEE Int. Conf. Commun., vol. 6, pp. 2881-2886, Jun. 11-15, 2006.

\* cited by examiner

METHODS AND SYSTEMS FOR PROVIDING FEEDBACK FOR BEAMFORMING

CROSS REFERENCE TO RELATED APPLICATION

This application claims the benefit of U.S. Provisional Patent Application No. 60/875,416, filed Dec. 14, 2006, which is hereby incorporated by reference herein in its entirety.

TECHNICAL FIELD

The disclosed subject matter relates to methods and systems for providing feedback for beamforming.

BACKGROUND

Digital wireless communication systems have gained widespread adoption in recent years. Common examples of digital wireless communication systems include wireless routers, which are frequently made according to the 802.11 standards, and mobile telephones.

A common problem with digital communication systems is multi-path fading as multiple copies of a signal propagate from a transmitter to a receiver via different paths. For example, one copy of a signal can propagate via a straight line between a transmitter and a receiver and another copy can propagate via a reflection off a structure between the transmitter and the receiver. Because the two copies of the signals are taking different paths, the copies will be out of phase when they reach the receiver. This can result in constructive or destructive interference. As a receiver moves relative to a fixed transmitter, the receiver will either pick up a stronger or weaker sum of the copies of the signal. This variation is fading in the signal.

To address multi-path fading problems, as well as other forms of signal degradation, orthogonal frequency divisional multiplexing (OFDM) has been adopted in many digital wireless systems. OFDM operates by sending digital signals across many different orthogonal subcarriers (or channels). Unlike some other forms of communication which attempt to send a large amount of data over a single carrier at high speed, OFDM spreads the data across multiple subcarriers at lower speeds. This enables OFDM systems to be more robust to interference problems.

To further improve the performance of OFDM wireless systems, multiple-input and multiple-output (MIMO) configurations of OFDM systems have been adopted. In a typical configuration, a MIMO system may use two or more transmit antennas and two or more receive antennas. By controlling the signals being output on these transmit antennas, beamforming can be used to control the beam shape of the transmitted signal. By controlling the shape of the beam transmitted by the antennas, various forms of signal degradation, including multi-path fading, can be reduced.

Accordingly, it is desirable to provide mechanism which improve beamforming in digital wireless communication systems.

SUMMARY

Methods and systems for providing feedback for beamforming are provided. In some embodiments, methods for providing feedback for beamforming are provided, the methods comprising: initializing a weighting vector; determining a perturbation vector; determining a plurality of weighting vectors to be applied to data based on the weighting vector and the perturbation vector; applying the plurality of weighting vectors to the data to provide weighted data; transmitting the weighted data to a receiver; receiving from the receiver a feedback signal based on at least one of the plurality of weighting vectors; and updating the plurality of weighting vectors based on the feedback signal.

In some embodiments, systems for providing feedback for beamforming are provided, the systems comprising: a transmitter that: initializes a weighting vector; determines a perturbation vector; determines a plurality of weighting vectors to be applied to data based on the weighting vector and the perturbation vector; applies the plurality of weighting vectors to the data to provide weighted data; transmits the weighted data to a receiver; receives from the receiver a feedback signal based on at least one of the plurality of weighting vectors; and updates the plurality of weighting vectors based on the feedback signal.

In some embodiments, systems for providing feedback for beamforming are provided, the systems comprising: means for initializing a weighting vector; means for determining a perturbation vector; means for determining a plurality of weighting vectors to be applied to data based on the weighting vector and the perturbation vector; means for applying the plurality of weighting vectors to the data to provide weighted data; means for transmitting the weighted data to a receiver; means for receiving from the receiver a feedback signal based on at least one of the plurality of weighting vectors; and means for updating the plurality of weighting vectors based on the feedback signal.

DETAILED DESCRIPTION

In accordance with various embodiments, mechanisms for providing feedback for beamforming are provided. These mechanisms can be used in any suitable digital-wireless-communication application.

As described in more detail below, in some embodiments, mechanisms for providing feedback for updating beamforming weighting vectors are provided. Beamforming weighting vectors can be applied to symbols being transmitted in wireless MIMO-OFDM system to improve the performance of the transmission. By updating these vectors using feedback, the signal power seen by the receiver can be made to respond to dynamic environmental conditions.

In some embodiments, for example, after initializing a base weighting vector, odd and even weighting vectors can be formed. These odd and even weighting vectors can then be multiplexed with information symbols to be transmitted over various OFDM subcarriers during alternating odd and even intervals. At the receiver, channels estimates for each of the subcarriers can be formed (as known in the art) and used, along with the odd and even weighting vectors, to form a feedback bit indicating which of the weighting vectors results in greater power at the receiver. This feedback bit can then be transmitted to the transmitter, where it is used to update the base weighting vector. After updating the base weighting vector, the actions above can be repeated.

Figure 1:
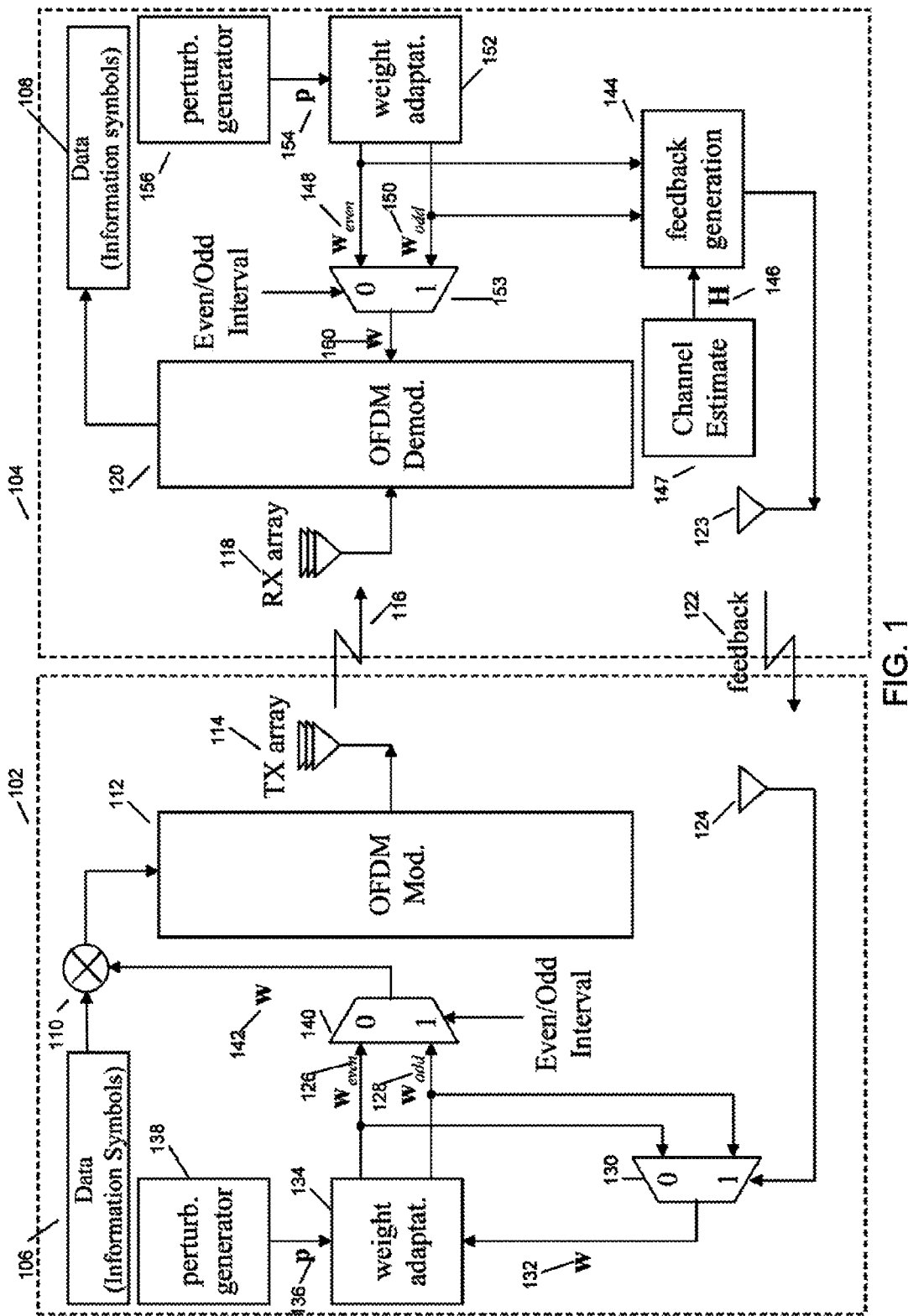
FIG. 1 is a diagram of a system for providing feedback for beamforming in accordance with some embodiments.
Figure 2:
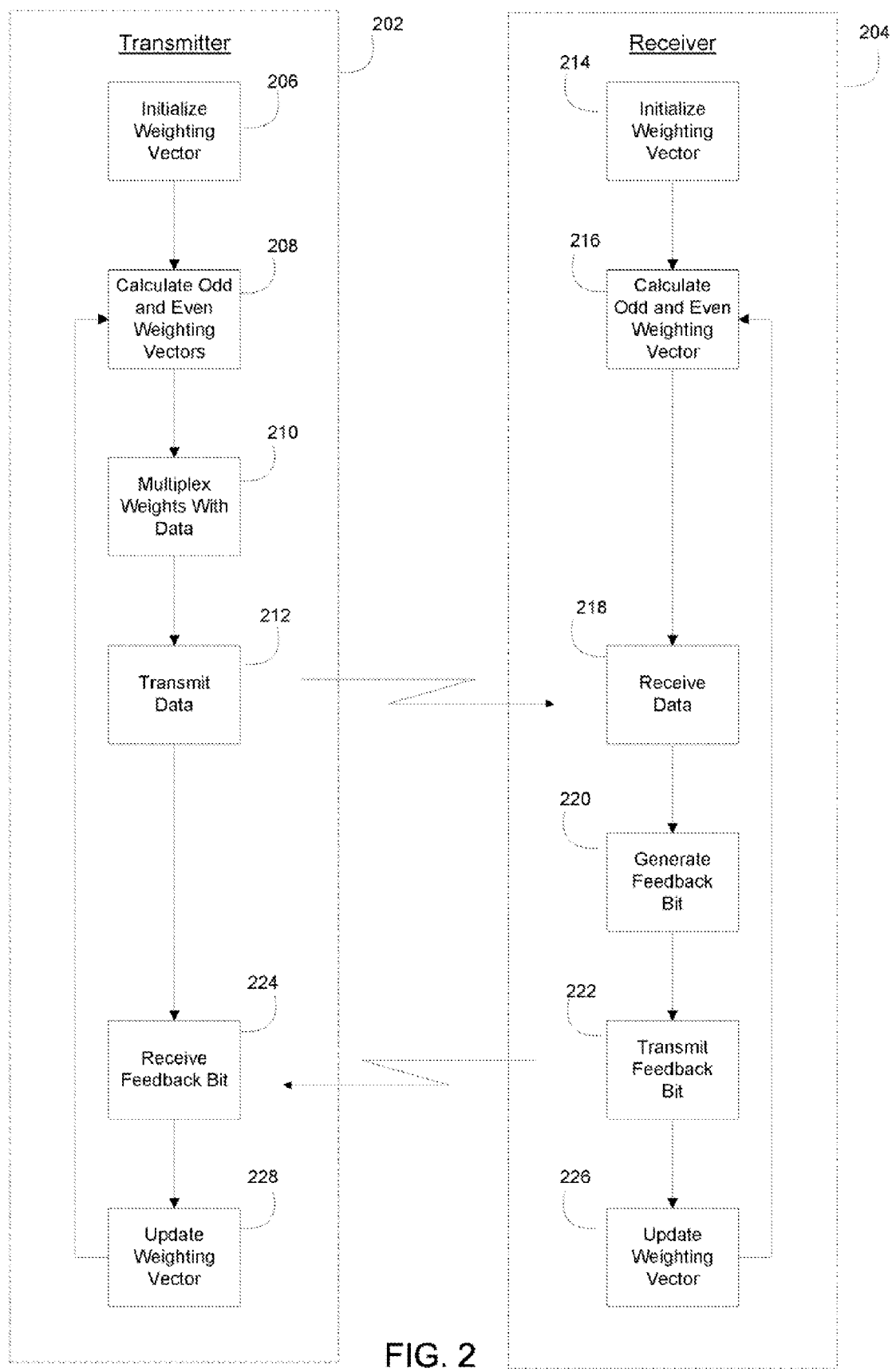
FIG. 2 is a diagram of processes that can be performing in a transmitter and a receiver for providing and using feedback for beamforming in accordance with some embodiments.

Turning to FIGS. 1 and 2, two diagrams illustrating the operation of a data transmitter and a data receiver for one subcarrier in a MIMO-OFDM system in accordance with some embodiments are shown. Although FIGS. 1 and 2 illustrate the operation of one subcarrier in such a system, any suitable number of subcarriers can be used in systems in accordance with some embodiments, and any one or more of such subcarriers can operate as illustrated in FIGS. 1 and 2.

As illustrated in FIG. 1, data 106 that is input to a transmitter 102 can be transmitted as a signal 116 and then received and output as data 108 by a receiver 104. Data 106 can be provided from any suitable source, such as a digital processing device that is part of, or coupled to, transmitter 102, and can be for any purpose. Similarly, data 108 can be provided to any suitable destination, such as a digital processing device that is part of, or coupled to, receiver 104, and can be for any purpose. Data 106 and data 108 can be in a modulated form using any suitable technique. For example, this data can be Quadrature Phase-Shift Keying (QPSK) modulated, Quadrature Amplitude Modulated (QAM), etc. In modulated form, data 106 and data 108 can be referred to as information symbols.

To provide beamforming in signal 116 during transmission, a weighting vector 142 can be multiplexed with data 106 by a multiplexer 110. This weighted data can then be provided to an OFDM modulator 112, which can modulate the weighted data. The modulated and weighted data can then be transmitted by a transmitter array 114 to receiver 104. Any suitable multiplexer, OFDM modulator and transmitter array can be used to multiplex, modulate and transmit the data signal. Once the transmitted data signal arrives at receiver 104, the data signal can be received by receiver array 118 and then be provided to OFDM demodulator 120, which can then demodulate signal 116 into data 108. Any suitable receiver array and OFDM demodulator can be used to receive and demodulate the data. Because the data received by the OFDM demodulator is weighted, a weighting vector 160 can be provided to OFDM demodulator 120 to facilitate receiving the signal.

Figure 3:
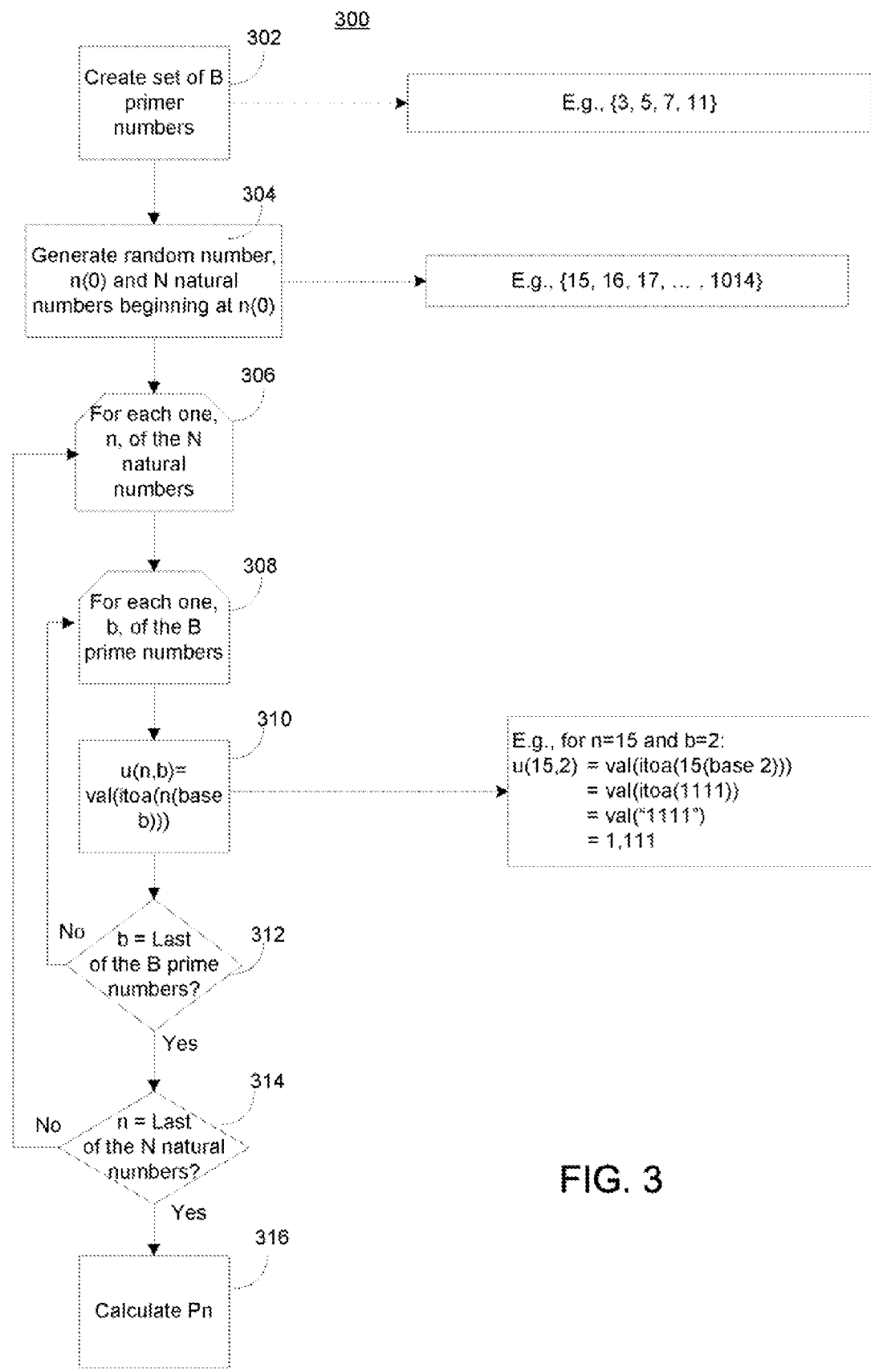
FIG. 3 is a diagram of a process for determining a perturbation vector in accordance with some embodiments.

The weighting vectors that are multiplexed with data 106 can be generated and updated in transmitter 102 to take advantage of feedback from receiver 104. More particularly, as illustrated, a feedback signal 122 can be provided by receiver 104 to transmitter 102 using feedback transmitter 123 and feedback receiver 124. Any suitable transmitter and receiver can be used for feedback transmitter 123 and feedback receiver 124. The feedback signal can then be used to select one of two weighting vectors used during a previous interval—an even weighting vector ($w_{even}$) 126 or an odd weighting vector ($w_{odd}$) 128—at multiplexer 130. The selected weighting vector 132 can then be provided to a weighting adaptation mechanism 134, which can produce a new even weighting vector 126 and a new odd weighting vector 128 using a perturbation 136 created by a perturbation generator 138 (which is described below in connection with FIG. 3). A multiplexer 140 can then select one of the new even weighting vector 126 and new odd weighting vector 128 as the new base weighting vector 142 based on a current even or odd interval slot so that the selected weighting vector can be multiplexed with the data to be transmitted. The application of weighting vectors to data is described further below in connection with FIGS. 5 and 6. Any suitable multiplexers, weighting adaptation mechanisms, a perturbation generators can be used.

To generate feedback signal 122, receiver 104 can include a feedback generation mechanism 144. In generating the feedback signal, feedback generation mechanism 144 can use one or more channel estimates (H) 146, even weighting vector 148, and odd weighting vector 150. The channel estimate(s) can be generated by channel estimate generator 147 using any suitable technique known in the art, such as by using pilot symbols as described in T. Cui, C. Tellambura, "Robust Joint Frequency Offset and Channel Estimation for OFDM Systems", IEEE Veh. Tech. Conf. 2004, vol. 1, pp. 603-607, 26-29 Sep. 2004, which is hereby incorporated by reference herein in its entirety. The odd and even weighting vectors can be produced by weighting adaptation mechanism 152 using perturbation 154 created by perturbation generator 156 (which can operate in the same manner as perturbation generator 138, and which is further described below in connection with FIG. 3). In addition to being used to generate the feedback signal, one of these weighting vectors can be selected by multiplexer 153 to producing weighting vector 160 used by OFDM demodulator 120 to receive signal 116. Any suitable mechanisms can be used to form feedback generation mechanism 144, weight adaptation mechanism 152, perturbation generator 156, and multiplexer 153.

In some embodiments, a digital processing device (e.g., such as a microprocessor) can be used to control weighting vector formation and feedback. For example, in transmitter 102, perturbation generator 138, weighting adaptation mechanism 134, and multiplexers 110, 130, and 140 can be implemented in a digital processing device running suitable software. As another example, in receiver 104, perturbation generator 156, weighting adaptation mechanism 152, multiplexer 153, and feedback generation mechanism 144 can be implemented in a digital processing device running suitable software.

Turning to FIG. 2, mechanisms for weighting, transmitting, and receiving data, generating feedback, and updating weighting vectors in connection with some embodiments are further illustrated. As mentioned above, FIG. 2 illustrates actions that can be taken in a transmitter 202 and a receiver 204 for one subcarrier of a MIMO-OFDM system, although the same actions can be taken in some embodiments in multiple subcarriers.

As shown at 206, the weighting vector (w) for the subcarrier can be initialized. Any suitable process for initializing the weighting vector can be used. For example, in some embodiments, the initial value for the weighting vector can be calculated randomly. As another example, in some embodiments, a code book can be used to calculate the initial value of w. More particularly, using the values from the codebook of Table 1, $\gamma_k^{LMMSE}$ can be calculated for each entry in the table using the following equation (1):

$$\gamma_k^{LMMSE} = \frac{1}{\sigma^2[w^H H^H H w + \sigma^2 I]_{k,k}^{-1}} - 1 \qquad (1)$$

This equation assumes that receiver 204 is a least-minimum-mean-square-error (LMMSE) receiver. When w possesses a Householder structure, further simplification in equation (1) can be attained. Particularly for the case of a 4×$N_R$×2 system (i.e., four transmitter antennas and two transmission ranks, and any number of receiver antennas), the product term inside the inverse can be written as follows in equation (2):

$$W^H H^H H W = \begin{bmatrix} \|h_1\|^2 & h_1^H h_2 \\ h_2^H h_1 & \|h_2\|^2 \end{bmatrix} - 2\begin{bmatrix} u_1 u^H H^H h_1 & u_1 u^H H^H h_2 \\ u_2 u^H H^H h_1 & u_2 u^H H^H h_2 \end{bmatrix} - \quad (2)$$

$$2\begin{bmatrix} u_1^A h_1^H Hu & u_2^A h_1^H Hu \\ u_1^A h_2^H Hu & u_2^A h_2^H Hu \end{bmatrix} + 4\begin{bmatrix} |u_1|^2 u^H H^H Hu & u_1 u_2^A u^H H^H Hu \\ u_2 u_1^A u^H H^H Hu & |u_2|^2 u^H H^H Hu \end{bmatrix}$$

Here, $h_i$ denotes the i-th column vector of the channel matrix (or channel estimate) H and $u_j$ is the j-th element of the vector u. Notice that the above expression only involves matrix-vector operations of three different terms: $u^H H^H h_1$, $u^H H^H h_2$, and $u^H H^H HU$. The rest are simply scalar complex multiplications and additions. This allows significant complexity reduction. A similar technique can be applied to 4×$N_R$×3 scenario or any other configuration.

The value of u that produces the largest value of $\gamma_k^{LMMSE}$ can then be used as the initial value for w.

TABLE 1

4 × $N_R$ × 2 Householder codebook: 4 bits

| # | u | Rows |
|---|---|---|
| 1 | 0.2927<br>0.1298 + 0.6512i<br>−0.0335 − 0.5622i<br>0.1662 + 0.3586i | 1, 2 |
| 2 | 0.5754<br>0.0530 + 0.2187i<br>−0.7569 + 0.1852i<br>0.0209 + 0.1035i | 1, 2 |
| 3 | 0.4379<br>0.4527 − 0.0588i<br>−0.3630 − 0.3639i<br>−0.3692 + 0.4465i | 1, 2 |
| 4 | 0.5062<br>−0.1806 − 0.1003i<br>0.6056 + 0.0988i<br>0.2603 − 0.5068i | 1, 2 |
| 5 | 0.0774<br>−0.3019 − 0.1046i<br>−0.2880 + 0.8634i<br>0.2237 + 0.1160i | 1, 2 |
| 6 | 0.1056<br>−0.5156 + 0.2733i<br>−0.5343 − 0.2538i<br>−0.5021 + 0.2152i | 1, 2 |
| 7 | 0.3474<br>0.1465 − 0.4442i<br>0.6611 − 0.4650i<br>−0.0535 + 0.0662i | 1, 2 |
| 8 | 0.3585<br>0.0138 + 0.3114i<br>−0.0018 + 0.1268i<br>−0.7014 + 0.5160i | 1, 2 |
| 9 | 0.4326<br>−0.4304 + 0.0481i<br>0.6963 + 0.1860i<br>0.1500 + 0.2888i | 1, 2 |
| 10 | 0.4225<br>−0.0582 − 0.3111i<br>−0.4713 − 0.1316i<br>−0.5823 − 0.3779i | 1, 2 |
| 11 | 0.6569<br>0.1485 − 0.0776i<br>−0.0998 − 0.4801i<br>0.5359 + 0.1125i | 1, 2 |
| 12 | 0.7509<br>−0.4061 − 0.1814i<br>0.0274 + 0.2670i<br>0.0993 − 0.3954i | 1, 2 |
| 13 | 0.3816<br>0.5020 + 0.1775i<br>0.3039 − 0.5125i<br>0.4323 − 0.1702i | 1, 2 |
| 14 | 0.6961<br>0.1961 + 0.5260i<br>−0.0002 − 0.0892i<br>−0.3517 + 0.2622i | 1, 2 |
| 15 | 0.1991<br>0.0523 − 0.4184i<br>0.0165 + 0.4263i<br>0.1029 − 0.7681i | 1, 2 |
| 16 | 0.1471<br>−0.2071 − 0.4459i<br>0.2385 − 0.1701i<br>0.6400 + 0.4912i | 1, 2 |

In order to facilitate demodulation of data and updating of weighting vectors, the weighting vectors used in the transmitter and the receiver can be synchronized. To do so, for example, as illustrated at 214, receiver 204 can also initialize a weighting vector in the receiver in the same manner as performed at 206.

Next, at 208, the odd and even weighting vectors can be calculated using the following equations (3) and (4):

$$w_n^e = \frac{w_n^b + \beta p_n}{\|w_n^b + \beta p_n\|} \quad (3)$$

$$w_n^o = \frac{w_n^b - \beta p_n}{\|w_n^b - \beta p_n\|} \quad (4)$$

where:
n indicates the subcarrier corresponding to this weighting vector.
$p_n$ is a perturbation for the subcarrier.
β is the adaptation rate, which determines how fast the weighting matrices change.
$w_n^b$ is the preferred weight vector (or base weighting vector) previously selected based on feedback, or is the initial value of w, for the subcarrier.
$w_n^c$ is the even weighting vector for the subcarrier.
$w_n^o$ is the odd weighting vector for the subcarrier.

The perturbation vector ($p_n$) can be calculated using any suitable technique. For example, the perturbation vector can be calculated using a Quasi Monte Carlo technique 300 illustrated in FIG. 3. As shown at 302, a first set of B prime numbers can be determined. B can be any suitable number and is based on the number of transmission antennas reflected in the dimensions of the weighting vectors. For example, for B equal to 4 for four transmission antennas, the set of prime numbers can be {3, 5, 7, 11}. Next, at 304, a random number $n_0$ can be generated and the first N natural numbers beginning at $n_0$ identified. Any suitable value for N can be selected, and can be based on the accuracy of tracking the channel modes. For example, for $n_0$ equal to 15 and N equal to 1000, the N identified numbers can be {15, 16, 17, ... , 1014}. Then, at 306 through 314, for each of the N identified numbers, a set of B elements can be created using respective ones, b, of the B prime numbers. Particularly, for each one, n, of the N identified numbers (looping between 306 and 314), each one of the B elements (looping between 308 and 312) can then be determined by taking the sequence of digits of n when expressed in base b (where b is a respective one of the B prime numbers) and using those digits to form a base 10 number. For example, with n=15 and b=2, the digits of n when expressed in base b are "1111." These digits can then be used to form the number 1,111 (in base 10). This formation of numbers can be performed for each combination of n and b to form a set of N×B numbers (u(N,B)). As illustrated in the figure, this can be represented in pseudo-code as u(n,b)=val(itoa(n(base b))), where n(base b) is the number n in base b, itoa( ) converts an integer number to a string, and val( ) converts a string to a base 10 number. This set of N×B numbers can be referred to as a Halton Sequence. Next, at 316 for each one, n, of the values N in the Halton Sequence, $p_n$ can be calculated using the following equation (5):

$$p_n = \frac{1}{B}\sum_{b=1}^{B} \phi^{-1}(u(n,b)) \qquad (5)$$

where:

$\phi^{-1}$ is an inverse mapping of the Gaussian distribution; and u(n,b) are the B numbers corresponding to each of the N values in the Halton Sequence.

$p_n$ is a gaussian random vector with zero mean and covariance Matrix I (indentity matrix).

This process is further described in D. Guo and X. Wang, "Quasi-Monte Carlo filtering in nonlinear dynamic systems", IEEE Trans. Sign. Proc., vol. 54, no. 6, pp. 2087-2098, June 2006, which is hereby incorporated by reference herein in its entirety.

Additionally or alternatively, the perturbation can be calculated using normal Monte-Carlo techniques or randomly. As stated above, any other suitable technique for determining the perturbation vector can be used.

Figure 4:
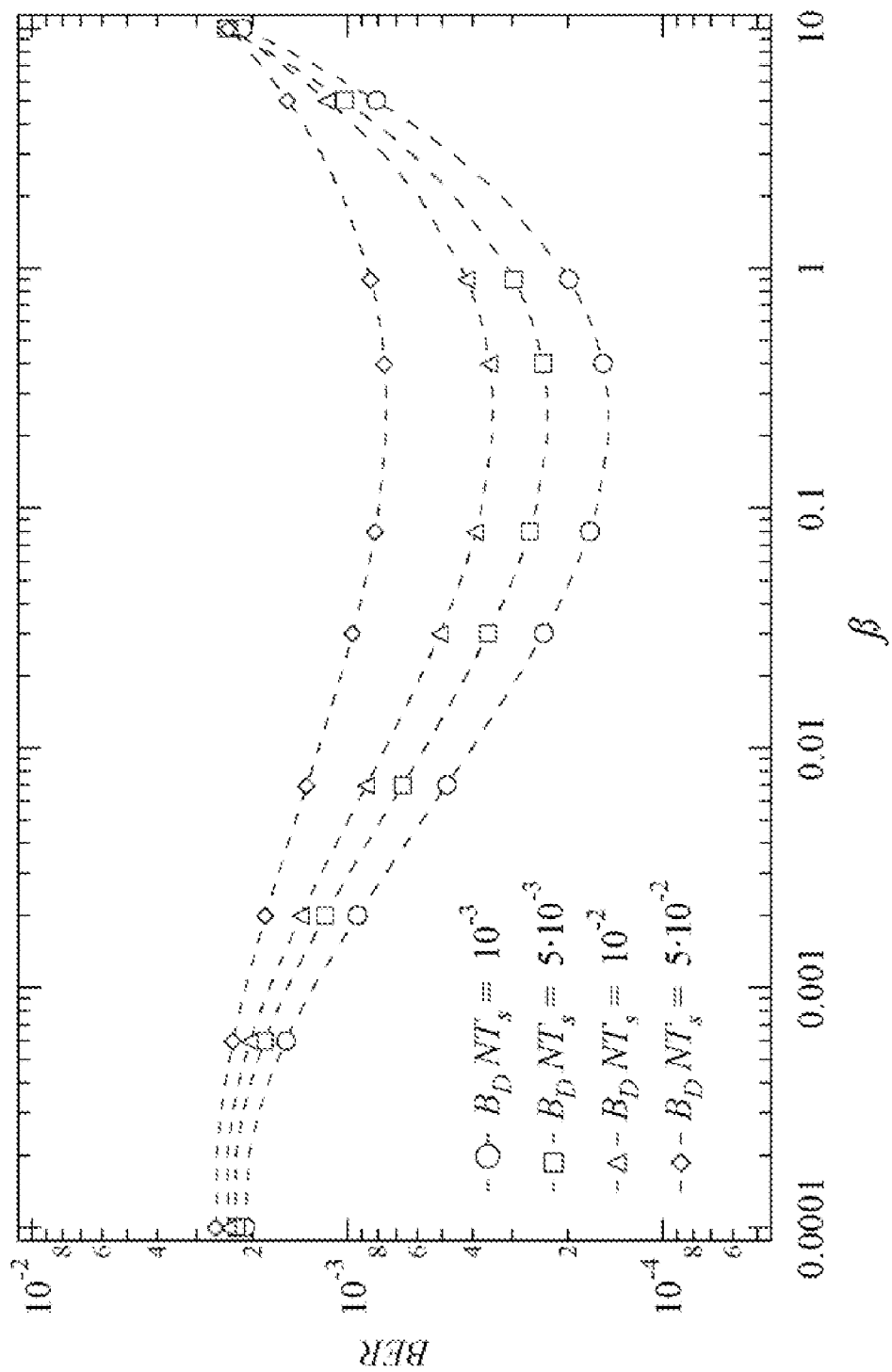
FIG. 4 is a graph illustrating a relationship between values of an adoption rate $\beta$ used in updating weighting vectors and Bit Error Rates in accordance with some embodiments.

As mentioned above, β is the adaptation rate of the perturbation $p_n$ into the even and odd weighting vectors. In fast changing environments, it can be desirable for the even and odd weighting vectors to change rapidly, and, thus, to use a large value of β. Example values for β versus resultant Bit Error Ratios (BER) are illustrated in FIG. 4 for different normalized Doppler bandwidths ($B_DNT_s$) for motion of the receiver and/or transmitter. Any suitable values for β can be used. For example, β equal to 0.2 can be used.

Returning to FIG. 2, once again, to maintain synchronization between the weighting vectors in the transmitter and receiver, at 216, the odd and even weighting vectors can also be calculated in the same manner as performed at 208

Figure 5:
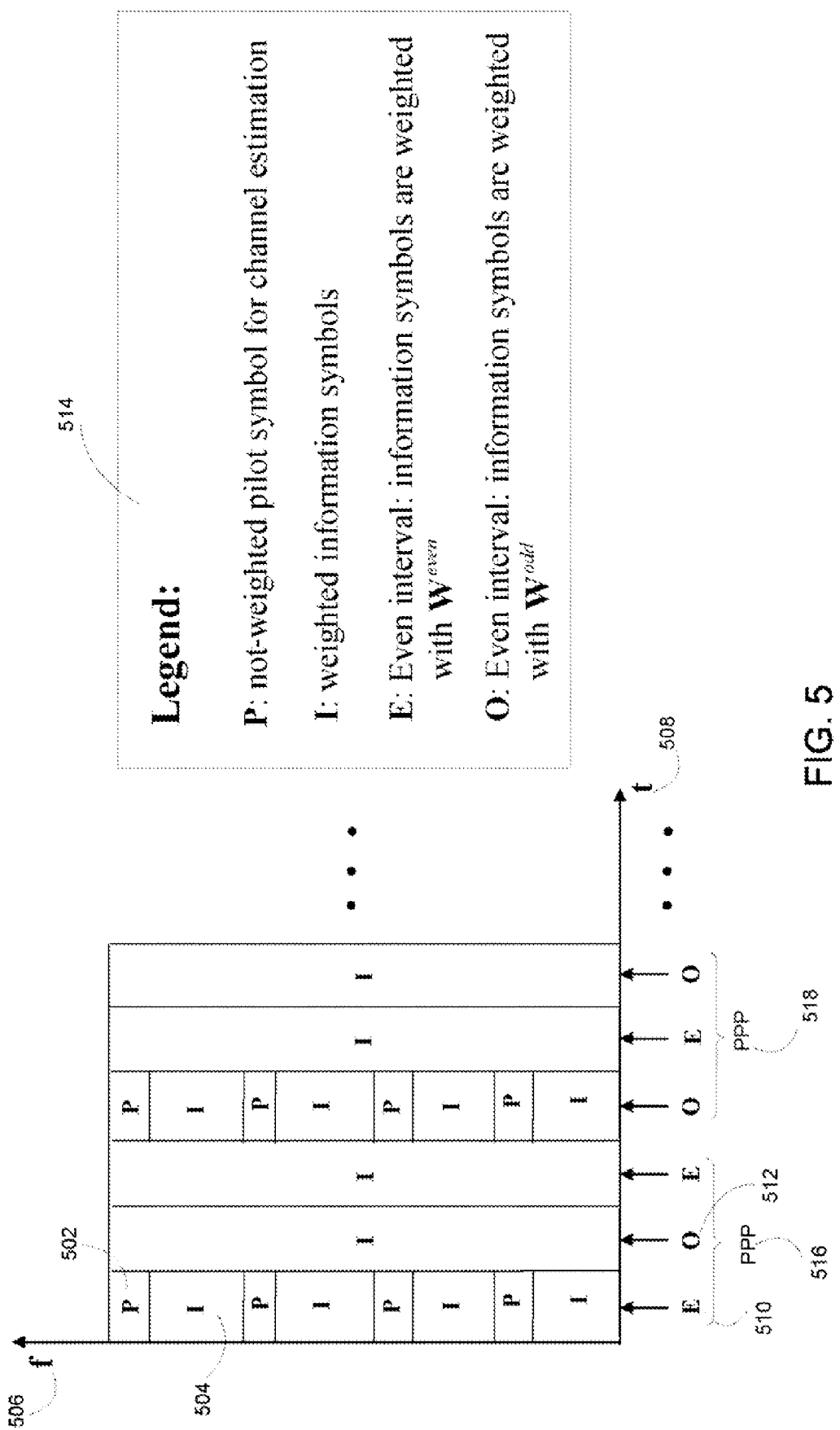
FIG. 5 is a diagram illustrating odd and even intervals containing information symbols and pilot symbols in accordance with some embodiments.
Figure 6:
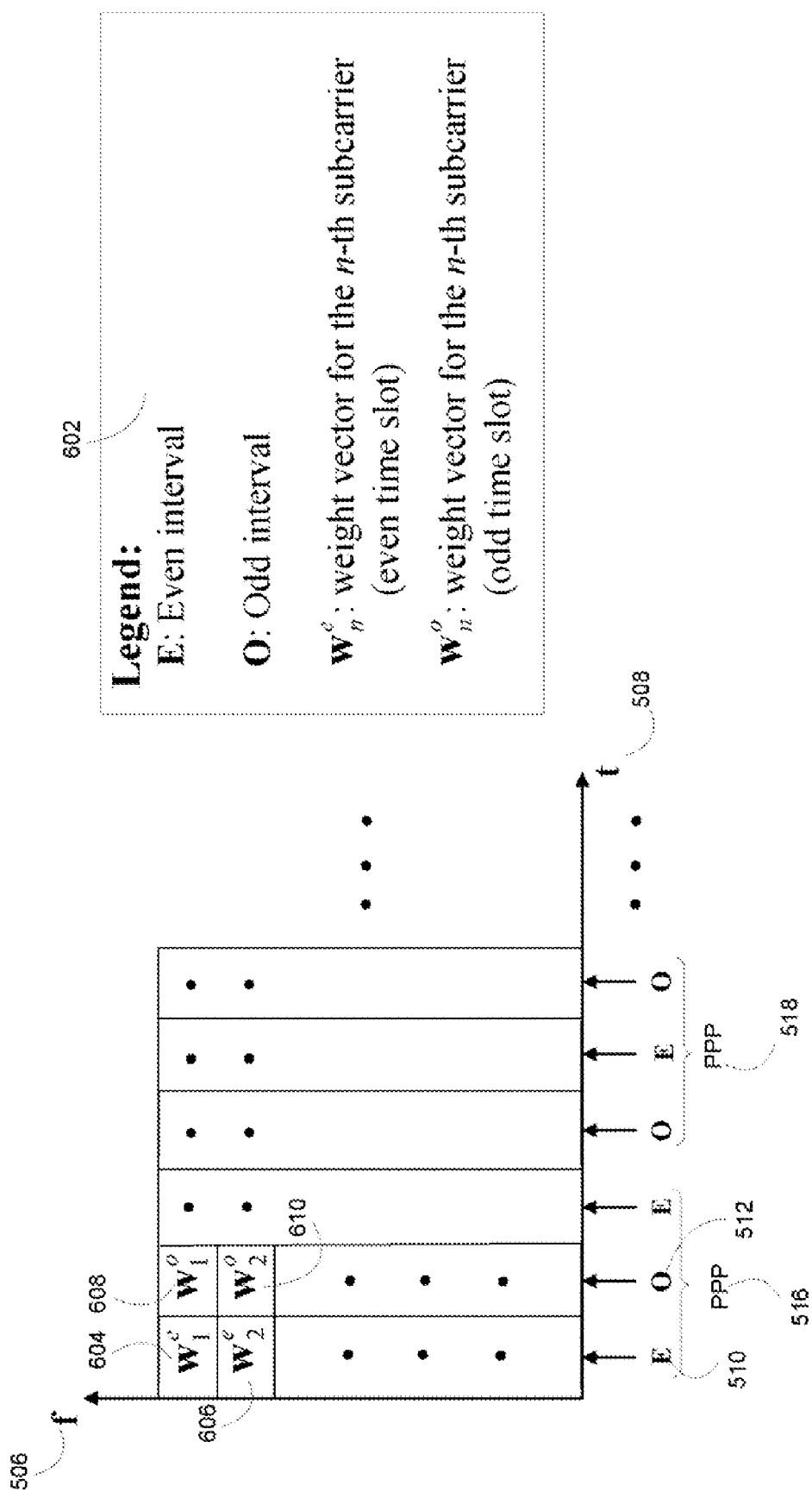
FIG. 6 is a diagram illustrating weighting vectors being applied to different subcarriers (or channels) during different time intervals in accordance with some embodiments.

Next, at 210, the data can be multiplexed with the odd and even weighting vectors in any suitable manner. For example, FIGS. 5 and 6 illustrate ways in which odd and even weighting vectors can be multiplexed with data. As shown in FIG. 5, for different subcarriers of a MIMO-OFDM system (which are represented at different points on f-axis 506), pilot symbols 502 and information symbols 504 can be transmitted at different time intervals 510 and 512 (which are represented at different points on t-axis 508). As indicated in legend 514, pilot symbols 502 can be not-weighted and used for channel estimation (as known in the art), information symbols 504 can be weighted using the even weighting vector during even intervals 510, and information symbols 504 can be weighted using the odd weighting vector during odd intervals 512.

Although pilot symbols are illustrated as being transmitted in every third interval in FIG. 5, and at an even spacing across subcarriers, any suitable approach to transmitting pilot symbols can be used. For example, in some embodiments, pilot symbols can be transmitted more or less frequently and/or on more or less subcarriers.

As also shown, multiple intervals 510 and 512 can form perturbation probing periods (PPP) 516 and 518. During a PPP, a feedback signal can be generated. This feedback signal can then be used to determine the odd and even weight vectors to be used during the next PPP.

Turning to FIG. 6, the weighting vectors 604, 606, 608, and 610 that can be used over even intervals 510 and odd intervals 512 are illustrated. As shown, a weighting vector $w_1^e$ 604 can be used to weight subcarrier 1 during even interval 510. A weighting vector $w_2^e$ 606 can be used to weight subcarrier 2 during even interval 510. A weighting vector $w_1^o$ 608 can be used to weight subcarrier 1 during interval 512. And, a weighting vector $w_2^o$ 610 can be used to weight subcarrier 2 during interval 512. Although two subcarriers are specifically identified in connection with FIG. 6, any suitable number of the subcarriers can have weighting applied.

Although odd and even intervals are illustrated in FIGS. 5 and 6 as occurring every other interval, any suitable approach for designating intervals as odd or even can be used. For example, a first pair (or any other suitable number) of intervals can be even, and the next pair (or any other suitable number) of intervals can be odd.

Referring back to FIG. 2, after the data is weighted at 210, the weighted data can be transmitted to receiver 204 at 212. This weighted data can then be received at 218. Any suitable technique can be used to transmit and receive the weighted data/information symbols. For example, the data/information symbols can be transmitted using MIMO-OFDM transmitters and receivers.

Next, at 220, the receiver can generate the feedback signal. For example, the feedback signal can be generated as a feedback bit using the following equation (6):

$$b_n = \text{sign}(\|H_n^e w_n^e\|_F^2 - \|H_n^o w_n^o\|_F^2) \qquad (6)$$

where:

$H_n^e$ is the channel gain matrix (or channel estimate) for the even ODFM intervals of a given PPP $H_n^o$ is the channel gain matrix (or channel estimate) for the odd ODFM intervals of a given PPP Equation (6) results in a $b_n$ being equal to +1 if the even weighting vector results in greater power for a given subcarrier n, and being equal to −1 if the odd weighting vector results in greater power for a given subcarrier n. In some embodiments, rather than using different channel gain matrices for the odd and even intervals, a single channel gain matrix can be used.

This feedback bit can then be transmitted from receiver 204 to transmitter 202 at 222 and 224. Any suitable technique for transmitting the feedback bit from the receiver to the transmitter can be used.

Next, at 226 and 228, the weighting vector in each of the receiver and the transmitter can be updated. For example, using the feedback bit, the weighting vector can be updated using the following equation:

$$w_n^b = \begin{cases} w_n^e, & \text{if } b_n = +1 \\ w_n^o, & \text{if } b_n = -1 \end{cases} \qquad (7)$$

That is, if the feedback bit is +1, then the weighting vector is set to the even weighting vector. Otherwise, if the feedback bit is −1, then the weighting vector is set to the odd weighting vector.

After updating the weighting vectors in the receiver and the transmitter, the processes shown loop back to 216 and 208, respectively.

In some embodiments, rather than initializing the weighting vectors in the transmitter and the receiver only once, these vectors are initialized periodically (e.g., every 100 intervals, every 30 PPP, etc.). This can be advantageous in fast changing environments where conditions can rapidly move back to preferring the initial weighting, or something close to it.

As mentioned above, FIGS. 1 and 2 illustrate a technique for updating beamforming on a single subcarrier. This technique can be used across multiple subcarriers in some embodiments. Rather than performing this technique for each subcarrier, in some embodiments, multiple subcarriers can be grouped and this technique can be performed on a subset of the subcarriers—e.g., the center subcarrier. The weighting vector determined for the center subcarrier can then be used for all subcarriers in the group.

While a single-bit feedback approach to updating beamforming has been described above, any suitable number of bits for feedback can be used in accordance with some embodiments. For example, in a two bit approach, rather that generating odd and even weighting vectors, four weighting vectors, labeled 1 through 4, can be generated. These weighting vectors can then each be applied to information symbols across every four intervals. Obviously, any other suitable approach can be used.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for providing feedback for beamforming, comprising:
   initializing a weighting vector;
   determining a perturbation vector using at least a Quasi Monte Carlo technique;
   determining a plurality of weighting vectors to be applied to data based on the weighting vector and the perturbation vector;
   applying the plurality of weighting vectors to the data to provide weighted data;
   transmitting the weighted data to a receiver;
   receiving from the receiver a feedback signal based on at least one of the plurality of weighting vectors; and
   updating the plurality of weighting vectors based on the feedback signal.

2. The method of claim 1, wherein the weighting vector is initialized using a codebook.

3. The method of claim 1, wherein the plurality of weighting vectors include an odd weighting vector and an even weighting vector.

4. The method of claim 1, wherein applying the plurality of weighting vectors to the data comprises multiplexing the data with the plurality of weighting vectors.

5. The method of claim 1, wherein the feedback signal is based on a channel estimate and the plurality of weighting vectors.

6. The method of claim 1, wherein updating the plurality of weighting vectors comprises selecting one of the plurality of weighting vectors as a preferred weighting vector and re-determining the plurality of weighting vectors based on the preferred weighting vector and the perturbation vector.

7. The method of claim 1, further comprising applying the plurality of weighting vectors to the data on a plurality of subcarriers.

8. The method of claim 1, wherein transmitting the weighted data to the receiver comprises transmitting the weighted data in a MIMO-OFDM system.

9. A system for providing feedback for beamforming, comprising:
   a transmitter that:
   initializes a weighting vector;
   determines a perturbation vector using at least a Quasi Monte Carlo technique;
   determines a plurality of weighting vectors to be applied to data based on the weighting vector and the perturbation vector;
   applies the plurality of weighting vectors to the data to provide weighted data;
   transmits the weighted data to a receiver;
   receives from the receiver a feedback signal based on at least one of the plurality of weighting vectors; and
   updates the plurality of weighting vectors based on the feedback signal.

10. The system of claim 9, wherein the weighting vector is initialized using a codebook.

11. The system of claim 9, wherein the plurality of weighting vectors include an odd weighting vector and an even weighting vector.

12. The system of claim 9, wherein the transmitter applies the plurality of weighting vectors to the data by multiplexing the data with the plurality of weighting vectors.

13. The system of claim 9, wherein the feedback signal is based on a channel estimate and the plurality of weighting vectors.

14. The system of claim 9, wherein the transmitter updates the plurality of weighting vectors by selecting one of the plurality of weighting vectors as a preferred weighting vector and re-determining the plurality of weighting vectors based on the preferred weighting vector and the perturbation vector.

15. The system of claim 9, wherein the transmitter also applies the plurality of weighting vectors to the data on a plurality of subcarriers.

16. The system of claim 9, wherein the transmitter, in transmitting the weighted data to the receiver, transmits the weighted data in a MIMO-OFDM system.

17. A system for providing feedback for beamforming, comprising:
   means for initializing a weighting vector;
   means for determining a perturbation vector using at least a Quasi Monte Carlo technique;
   means for determining a plurality of weighting vectors to be applied to data based on the weighting vector and the perturbation vector;
   means for applying the plurality of weighting vectors to the data to provide weighted data;
   means for transmitting the weighted data to a receiver;
   means for receiving from the receiver a feedback signal based on at least one of the plurality of weighting vectors; and
   means for updating the plurality of weighting vectors based on the feedback signal.

18. The system of claim 17, further comprising means for applying the plurality of weighting vectors to the dam on a plurality of subcarriers.

19. The system of claim 17, wherein the means for initializing the weighting vector initializes the weighting vector using a codebook.

20. The system of claim 17, wherein the plurality of weighting vectors include an odd weighting vector and an even weighting vector.

21. The system of claim 17, wherein the means for applying the plurality of weighting vectors, in applying the plurality of weighting vectors to the data, multiplexes the data with the plurality of weighting vectors.

22. The system of claim 17, wherein the feedback signal is based on a channel estimate and the plurality of weighting vectors.

23. The system of claim 17, wherein the means for updating the plurality of weighting vectors, in updating the plurality of weighting vectors, selects one of the plurality of weighting vectors as a preferred weighting vector and re-determines the plurality of weighting vectors based on the preferred weighting vector and the perturbation vector.

24. The system of claim 17, wherein the means for transmitting the weighted data, in transmitting the weighted data to the receiver, transmits the data in a MIMO-OFDM system.

* * * * *

UNITED STATES PATENT AND TRADEMARK OFFICE
CERTIFICATE OF CORRECTION

| | | |
|---|---|---|
| PATENT NO. | : 7,965,803 B2 | Page 1 of 1 |
| APPLICATION NO. | : 11/957385 | |
| DATED | : June 21, 2011 | |
| INVENTOR(S) | : Xiaodong Wang et al. | |

It is certified that error appears in the above-identified patent and that said Letters Patent is hereby corrected as shown below:

Col. 11, line 2, "dam," should be --data--.

Signed and Sealed this
Sixth Day of March, 2012

David J. Kappos
*Director of the United States Patent and Trademark Office*